United States Patent [19]
Giebler

[11] 3,790,822
[45] Feb. 5, 1974

[54] CIRCUIT ARRANGEMENT FOR THE INTERRUPTION-FREE SWITCH-OVER FROM AN OPERATING CURRENT SUPPLY APPARATUS TO A STANDBY CURRENT SUPPLY APPARATUS

[75] Inventor: Fritz Giebler, Munich, Germany

[73] Assignee: Siemens Aktiengesellschaft, Berlin und Munich, Germany

[22] Filed: Dec. 7, 1970

[21] Appl. No.: 95,448

[30] Foreign Application Priority Data
Dec. 29, 1969 Germany............... P 19 65 315.7

[52] U.S. Cl................................ 307/254, 307/296
[51] Int. Cl. ........................................ H03k 17/00
[58] Field of Search ................................ 328/224; 307/64–66, 296, 254

[56] References Cited
UNITED STATES PATENTS
3,596,106   7/1971   Raddi................................ 307/66
3,577,003   4/1971   Behr.................................. 307/66
3,428,820   2/1969   Lyon.................................. 307/64
3,002,105   9/1961   Cady.................................. 307/64

Primary Examiner—John S. Heyman
Assistant Examiner—B. P. Davis
Attorney, Agent, or Firm—Birch, Swindler, McKie & Beckett

[57] ABSTRACT

A switching circuit for switching a standby power supply into operation when the voltage output from the operating supply drops below a predetermined and adjustable minimum is described. The standby power supply is connected to the consumer apparatus over the emitter-collector path of a transistor. The transistor is rendered conductive in dependence on the voltage from said operating supply and the error signal generated by a supervision system in said operating supply.

3 Claims, 3 Drawing Figures

CIRCUIT ARRANGEMENT FOR THE INTERRUPTION-FREE SWITCH-COVER FROM AN OPERATING CURRENT SUPPLY APPARATUS TO A STANDBY CURRENT SUPPLY APPARATUS

BACKGROUND OF THE INVENTION

The invention concerns a circuit arrangement for the interruption-free switch-over from an operating current supply apparatus to a standby current supply apparatus wherein the operating current supply apparatus is connected to the consumer over a diode, and the standby current supply apparatus is connected to the consumer if the operating current voltage goes below a predetermined minimum value. The latter value may be selected.

In centrally controlled installations in data processing and switching systems as a rule, an interruption-free current supply is required. As the operating current supply apparatus can fail, the necessary reliability can only be achieved by the interruption-free connection of a standby current supply apparatus to the consumer. Heretofore, usually the arrangement shown in FIG. 1 was used. The operating current supply apparatus and the standby current apparatus, assigned to a group of consumers, were connected to the consumers over buffer diodes. This arrangement possessed the advantage of a simple construction and thereby high reliability. As, however, diodes DE may not be conducting during normal operation with an operating current supply apparatus, a voltage difference between the output voltages of the operating current supply apparatus and the standby current supply apparatus is required. In the case of the low voltages usually used with integrated switching this voltage difference and the scattering of the diode passing voltages cause inadmissibly high tolerances in the voltage at the consumer.

It is, therefore, an object of the invention to provide a circuit arrangement which possesses the great reliability of the known arrangement, but also makes possible a correct maintaining of the voltage at the consumer.

SUMMARY OF THE INVENTION

According to the invention the aforementioned and other objects are attained by making the standby current supply apparatus connectible to the consumer, over the emitter-collector path of a transistor which is controlled by an amplifier in dependence on the output voltage of the operating current supply appartus, and the error signal of a voltage supervision system within the operating current supply apparatus.

As the standby current supply apparatus is now connected to the consumer through a controllable electronic switch, a voltage difference between the output voltages of the operating current supply apparatus and the standby current supply apparatus is no longer necessary. The output transistor used possesses the high switching speed required for an interruption-free switch-over. The short voltage break resulting at switch-over can be bridged over by capacitors connected in parallel to the consumer.

In a preferred embodiment of the invention the measuring probe or terminal of the voltage control system of each operating current supply apparatus is connected directly to the consumer, while the measuring probe or terminal of the voltage control system of the standby current supply apparatus is connected with the output of the standby current supply apparatus intself. This arrangement has the advantage that upon supplying of the consumer by the operating current supply apparatus the accuracy of the voltage emitted by this apparatus remains intact, while the voltage drop at the buffer diode is balanced out by the apparatus. A switch-over of the measuring terminal of the voltage control system of the standby current supply apparatus is not necessary as the said transistor is selected to have a low passing-voltage that the variation thereof causes no inadmissible tolerance in the voltage at the consumer. Thus, with the arrangement according to the invention in normal operation with an operating current supply apparatus the same reliability as in the known arrangement, but a greater accuracy of the voltage at the consumer, are achieved.

BRIEF DESCRIPTION OF THE DRAWINGS

The invention may be best understood by reference to the description given hereinbelow of a preferred embodiment in conjunction with the drawings, in which.

Figure 1:
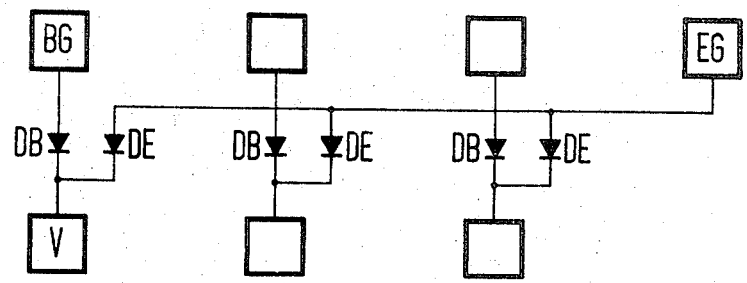
FIG. 1 is a block diagram illustration of a prior art circuit.
Figure 2:
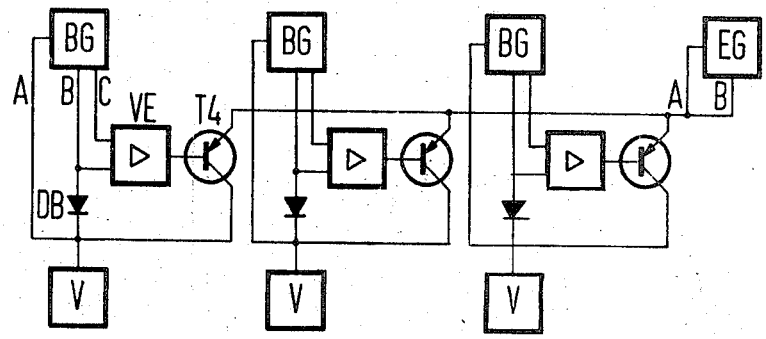
FIG. 2 shows a block circuit diagram of a preferred arrangement according to the invention, and FIG. 3 the circuit of an amplifier used in the FIG. 2 embodiment

DETAILED DESCRIPTION OF THE DRAWINGS:

FIG. 2 is a block circuit diagram of a current supply having the capability of switching over to a standby current supply apparatus EG for a group of three consumers, V. Supply line B of an operating current supply apparatus BG is connected in each case over a diode DB with consumer V. The measuring terminal A is directly connected to consumer V. Supply line B and signal line C from the voltage supervision device at power supply BG. in each case also lead to the control inputs of amplifiers VE, which in turn control transistors T4. The emitters of all transistors T4 are connected with the supply line B of standby current supply apparatus EG.

Figure 3:
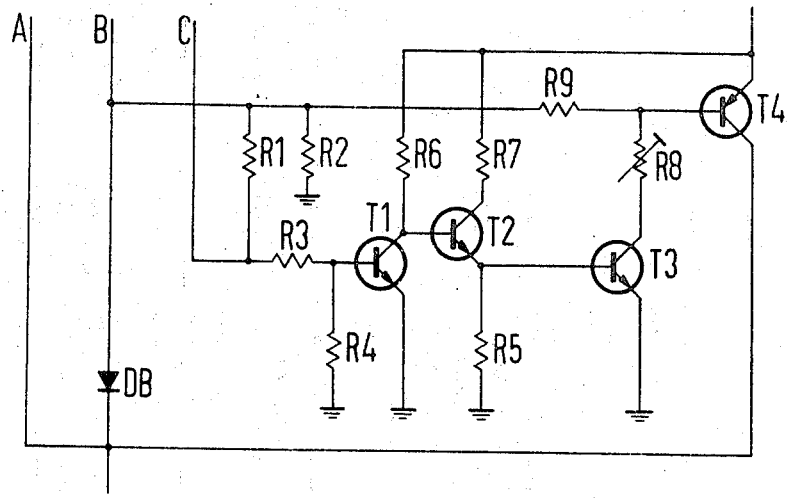

A preferred embodiment of an amplifier VE is shown in FIG. 3. Under normal operation consumer V is supplied over supply line B and buffer diode DB. PNP transistor T4 is then blocked, because resistor R9 couples a positive voltage to the base of T4 opposing the emitter. NPN transistor T1 is in conducting condition, because a positive voltage is coupled to the base thereof over resistors R1 and R3. The bases of transistors T2 and T3 are, therefore, nearly at ground potential so that these transistors are blocked, and a base current cannot flow in transistor T4.

If the output voltage of the operating current supply apparatus BG goes below a limiting value settable in the apparatus, the voltage supervision device of the apparatus responds. Any suitable conventional voltage responsive means may be used to accomplish this result commensurate with the operating parameters described herein. Such a device would be a zener diode, as is used in U.S. Pat. No. 3,596,106. Over signal line C and resistor R3 this voltage supervision device couples a signal to the base of transistor T1, which renders it non-conductive. Thereby the transistors T2 and T3 are controlled into the conducting condition. The base current of transistor T4 can now flow over collector resistor R8 of transistor T3. The large variations of the base-emitter voltage drop of transistor T4, however, lead to great variations of the base current of transistor T4. In order to compensate for these variations an adjustable resistor was selected for resistor R8. The now conducting transistor T4 connects the standby current supply apparatus EG to the consumer.

If the deficient operating current supply apparatus is replaced by an operable, but not yet operational, one, the error signal of the voltage supervision system of this operating current supply apparatus is absent at the input of transistor T1. In order to, nevertheless, maintain transistor T1 in blocked condition, and thereby transistors T2, T3 and T4 in conducting condition, a correspondingly defined potential must be coupled to the base of transistor T1. For this purpose resistor R2 is provided. Over it and over resistors R1 and R3 ground potential is coupled to the base of transistor T1.

If the voltage of the operating current supply apparatus returns, and if the error signal on signal line B is disconnected, transistor T4 is again blocked, and the standby current supply apparatus disconnected.

The description of a preferred embodiment of the invention given hereinabove is only exemplary, and it is contemplated that modifications and changes thereto may be made within the scope of the appended claims.

We claim:

1. Apparatus for switching a consumer apparatus from an operating power supply to a stand-by power supply in an interruption-free manner when the voltage of said operating power supply drops below a predetermined minimum value, comprising:

a transistor for switching from the operating power supply to the stand-by power supply and vice versa, means connecting said stand-by power supply to said consumer apparatus over the collector-emitter path of said transistor, amplifier means for controlling said transistor from a non-conductive to a conductive state and vice versa, and means for generating an error signal when the operating supply voltage drops below said predetermined minimum value, said amplifier means including means for controlling the conductivity of said transistor responsive to said operating supply voltage and said error signal voltage.

2. The apparatus described in claim 1, further comprising:

first voltage measuring terminal for said error means directly connected to said consumer apparatus, and a second voltage measuring terminal for said standby supply connected to the output of said standby supply.

3. The apparatus described in claim 1, further comprising:

a diode connecting said operating supply to said consumer apparatus, one electrode of said diode being connected to the base of said transistor, the other electrode of said diode being connected to the collector of said transistor.

* * * * *